Sept. 27, 1966   J. W. ROBERTS   3,274,841
CONTINUOUS TENSION BELT ADJUSTING BRACKET
Filed May 6, 1965
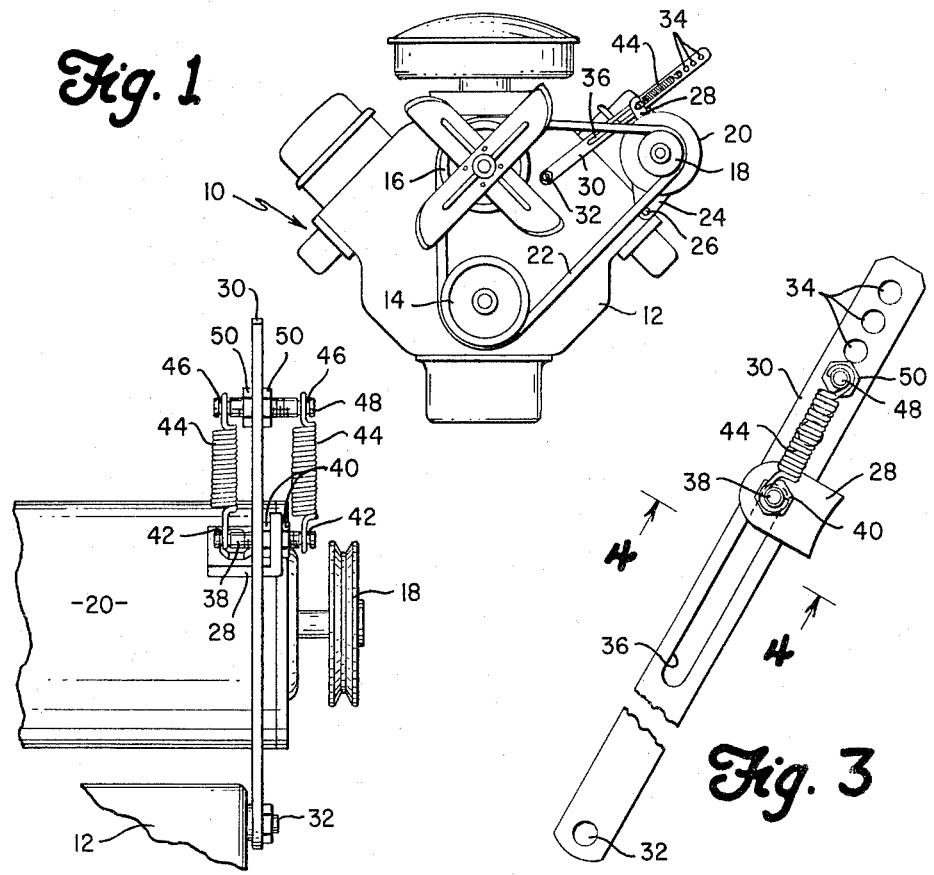
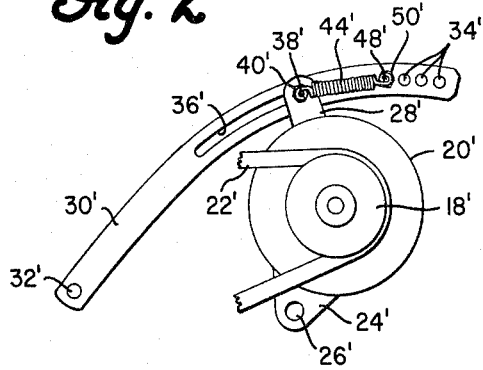
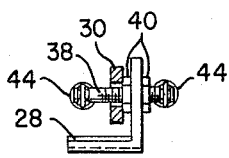
INVENTOR.
JOHN W. ROBERTS
BY
Frazer & Frazer
ATTORNEYS 3,274,841
CONTINUOUS TENSION BELT
ADJUSTING BRACKET
John W. Roberts, 6408 Highland Ave., Tampa, Fla.
Filed May 6, 1965, Ser. No. 453,627
3 Claims. (Cl. 74—242.13)

The present invention relates to a bracket mechanism for maintaining continuous tension on a driving belt for transmitting power from a driving member to a driven member.

It is well known in equipment driven by conventional V-belts that the driving efficiency between the driving and the driven members is decreased by the stretching and/or wearing of the associated belts. Manifestly, the stretching or wearing of the belts will also cause excessive wear on the attendant equipment, as well as slippage wear on the belt.

An object of the present invention is to produce a simple and efficient bracket mechanism which may readily be applied to existing power systems such as, for example, automotive and marine generators, alternators, and compressors for maintaining a continuous tension on the belt between the driving and the driven members regardless of the amount of stretching or wear occurring on the belt or associated sheaves.

In a preferred embodiment the invention contemplates a continuous tension belt adjusting device for the belt of an electric generator or the like mounted for pivotal movement comprising an elongate rigid bracket arm, means for mounting one end of the bracket arm to extend in a plane generally normal to the armature shaft of the generator, at least one aperture formed in the bracket arm adjacent the free end thereof, slide means mounted on the bracket arm adapted to slide on the bracket arm between predetermined limits, coupling means for coupling the generator to the slide means, and spring means connected between the slide means and the aperture of the bracket arm for applying a continuous tension against the generator tending to urge the generator in one direction about its pivotal mounting.

Other objects and advantages of the invention will become more clearly apparent from reading the following detailed description of several embodiments of the invention in the light of the accompanying drawings, in which:

FIGURE 1 is a front elevational view of an internal combustion engine system employing a belt tightening bracket embodying the concepts of the invention;

FIGURE 2 is an enlarged fragmentary side elevational view of a portion of the system illustrated in FIGURE 1;

FIGURE 3 is an enlarged detail view of the bracket mechanism illustrated in FIGURES 1 and 2;

FIGURE 4 is a sectional view of the bracket mechanism taken along line 4—4 of FIGURE 3; and FIGURE 5 isi an enlarged fragmentary view of a modified form of the invention illustrated in FIGURES 1, 2, 3, and 4.

Referring to FIGURES 1, 2, 3 and 4, there is shown a conventional internal combustion engine 10 having a main engine block 12. A driving sheave 14, coupled to the crankshaft of the engine 10, is drivingly connected to a sheave 16 of an associated water pump and fan, and a sheave 18 keyed to the armature shaft of a generator 20 by means of a conventional V-shaped driving belt 22.

The generator 20 includes a depending bracket member 24 which is privotally mounted to the engine block 12 by means of capscrews 26, for example. On the outer surface of the housing of the generator 20, at a point removed from the bracket 24, there is a generally L-shaped upstanding bracket 28 which is connected to a continuous-tension bracket arm 30. The bracket 28 may be threadably fastened, welded, or otherwise suitably affixed to the housing of the generator 20.

The bracket arm 30 is in the form of an elongate metal bar having one end pivotally connected to the engine block 12 by means of a pivotal connection 32, and the opposite end is provided with a plurality of spaced apertures 34. An elongate slot 36 is formed in the body of the bracket arm 30 intermediate the pivotal connection 32 and the apertures 34.

A pin 38 is preferably threadably fastened to the upstanding bracket 28 by a pair of cooperating threaded fasteners 40. The pin 38 extends generally normal to the upstanding portion of the bracket 28. One end of the pin 38 is adapted to be disposed to slide or move within the slot 36 of the arm 30. The pin 38 may be laterally adjusted relative to the bracket 28 by the pair of cooperating fasteners 40 in the usual manner. The opposite end portions of the pin 38 are provided with annular recesses 42 which are effective to receive and retain one of the ends of a pair of helical springs 44. The springs 44 are typically formed of a case-hardened steel material. The opposite ends of the helical springs 44 are adapted to be received and retained within annular recesses 46 of an adjustable pin 48. The pin 48 is tightly secured within the desired one of the apertures 34 by means of a pair of cooperating lock nuts 50.

It will be appreciated that the position of the pin 48 within the apertures 34 of the bar 30 and the springs 44 determine the amount of tension of the sheave 18 of the generator 20 against the driving belt 22. For a given spring size, the more remote placement of the pin 48 in the apertures 34 from the pin 38, the greater the tension applied against the belt 22. Manifestly, the tension thus created by the springs 44 continuously applies a force tending to rotate the entire generator 20 about its pivotal point determined by the pivotal connection 26. Since the position of the fan and water pump sheave 16 and the driving sheave 14 are fixed with respect to the engine block 12 and the sheave 18 of the generator 20 is movable relative thereto, tension is continuously maintained on the belt 22 by the continuous tendency of the generator to be urged about the pivotal connection 26.

Accordingly, it will be appreciated that upon any stretching or wearing of the belt 22, or wearing of the associated sheaves 14, 16 or 18, the springs 44 of the continuous tension bracket arm 30 will automatically compensate and apply the continuous tension to the driving belt, thereby assuring a continuously efficient driving connection throughout the system.

Further, it will be understood by those skilled in the art, that the above described assemblage may be employed for a variety of belt sizes by merely repositioning the adjustable pin 48 in a suitable aperture 34 of the continuous-tension bracket arm 30.

A modified form of the invention is illustrated in FIGURE 5, wherein prime reference numerals are employed to designate elements corresponding to those illustrated in FIGURES 1, 2, 3 and 4. With reference to FIGURE 5, there is shown a sheave 18′ keyed to the armature shaft of a generator 20′ which is driven by a conventional V-belt 22′. The generator 20′ includes a depending bracket member 24′ which is adapted to be pivotally mounted on an associated engine block of an internal combustion engine, not shown, for example. The pivotal movement of the generator 20′ is effected about a pivotal connecting point 26′. On the outer surface of the housing of the generator 20′, at a point remote from the bracket member 24′, there is a generally L-shaped upstanding bracket 28′ which is connected to a continuous-tension bracket arm 30′. The bracket arm 30′ is similar to the bracket arm 30 shown in FIGURES 1 to 4, except that it is generally arcuate in shape.

The bracket arm 30' may be securely affixed to the associate engine block at the point 32'. Since the bracket arm 30' is arcuate in shape, it need not be pivotally mounted to the engine block as preferred in the above described embodiment as will be appreciated hereinafter.

A plurality of spaced apertures 34' are formed in the bracket arm 30' at the end thereof opposite the engine block connecting point 32'. An elongate arcuate slot 36' is formed in the body of the bracket arm 30' intermediate the connecting point 32' and the spaced apertures 34'.

A pin 38' is threadably fastened to the upstanding bracket 28' by a pair of cooperating nuts 40', only a single one of which is visible in FIGURE 5. It will be noted that the pin 38' extends generally normal to the upstanding portion of the bracket 28'. One end of the pin 38' is adapted to be disposed to slide within the slot 36' of the arm 30'. The pin 38' may be laterally adjusted relative to the bracket 28' by the pair of cooperating nuts 40' in the usual manner.

An adjustable pin 48' is adapted to be tightly secured in any one of the apertures 34' by a pair of cooperating lock nuts 50', only a single one of which is illustrated in FIGURE 5. The respective ends of the pins 38' and 48' are connected together by helical spring members 44', only a single one of which is illustrated. The springs 44' maintain a spring tension on the pin 38' tending to urge the generator 20' to pivot about the pivot connecting point 26' of the depending bracket 24'. In the most efficient embodiment, the arc of the slot 36' would be about a radius having its center point located at the pivotal connecting point 26' of the depending bracket 24'. Such arrangement would permit the pin 38' to slide smoothly within the slot 36'.

From the above description, it will be appreciated that the assembly may be mounted directly on any power unit powered by V-belts and will exert continuous tension on the V-belt driving equipment, taking up any stretching occurring in the belt and resulting in no slippage in the belt, eliminating wear on the equipment and the belt, and indirectly resulting in fewer repairs to the associated equipment and increasing the useful life of the primary power source. The continuous tension belt adjusting bracket requires no modification of the equipment to which it is attached. Actually, the assembly may be used to replace the belt tightening bar which is typically employed in the conventional belt driven systems.

Clearly, the continuous tension bracket arm of the invention may be made in a variety of lengths, widths and shapes without departing from the spirit of the invention.

In accordance with the provisions of the patent statutes, I have explained the principles and mode of operation of my invention, and have illustrated and described what I now consider to represent its best embodiments. However, I desire to have it understood that, within the scope of the appended claims, the invention may be practiced otherwise than as specifically illustrated and described.

What I claim is:

1. A continuous tension belt adjusting device for the belt of an electric generator mounted for pivotal movement, comprising:
   an elongate rigid bracket arm, said bracket arm having a slot formed therein intermediate the opposing ends thereof;
   means mounting one end of said bracket arm to extend in a plane generally normal to the armature shaft of the generator;
   a bracket secured to said generator and having a portion extending outwardly thereof;
   first pin means secured to the outwardly extending portion of said bracket having a portion thereof extending into and through the slot in said bracket arm, said first pin means being slidable in the slot in said bracket arm from one end thereof toward the other;
   second pin means secured adjacent the other end of the slot of said bracket arm; and
   tension spring means connecting said first and second pin means for applying a continuous spring tension against the generator, tending to urge the generator about its pivotal mounting.

2. A continuous tension belt adjusting device as claimed in claim 1 wherein said slot is arcuate.

3. A continuous tension belt adjusting device as claimed in claim 1 wherein said spring means includes a pair of tension springs, one of said springs being disposed on one side of said arm and connected between said first and second pin means, and the other of said springs being disposed on the other side of said arm and connected between said first and second pin means.

References Cited by the Examiner

UNITED STATES PATENTS

| | | | |
|---|---|---|---|
| 1,188,569 | 6/1916 | Stauffer | 74—242.15 |
| 1,978,526 | 10/1934 | Eppler | 74—242.15 |
| 2,125,004 | 7/1938 | Hamerstadt. | |
| 2,310,081 | 2/1943 | Hill | 74—242.11 X |
| 2,806,382 | 9/1957 | Gehrke | 74—242.11 |
| 3,048,056 | 8/1962 | Wolfram. | |

FOREIGN PATENTS

| | | |
|---|---|---|
| 565,896 | 11/1923 | France. |
| 107,500 | 7/1917 | Great Britain. |
| 436,587 | 6/1948 | Italy. |

DAVID J. WILLIAMOWSKY, *Primary Examiner.*

J. A. WONG, *Assistant Examiner.*